United States Patent
Balmer (10) Patent No.: US 9,868,532 B2
(45) Date of Patent: Jan. 16, 2018

(54) ADJUSTABLE VENT CLIP AND GRIPPING CLAMP SYSTEM

(71) Applicant: Daymen US, Inc., Petaluma, CA (US)

(72) Inventor: Noah Balmer, Santa Rosa, CA (US)

(73) Assignee: Vitec Holdings Italia SRL, Vicenza (IT)

( * ) Notice: Subject to any disclaimer, the term of this patent is extended or adjusted under 35 U.S.C. 154(b) by 0 days.

(21) Appl. No.: 15/139,340

(22) Filed: Apr. 27, 2016

(65) Prior Publication Data

US 2017/0072872 A1    Mar. 16, 2017

Related U.S. Application Data (60) Provisional application No. 62/153,491, filed on Apr. 27, 2015.

(51) Int. Cl.
| | | |
|---|---|---|
| *F16M 13/00* | (2006.01) | |
| *B64D 11/06* | (2006.01) | |
| *F16M 13/02* | (2006.01) | |
| *F16M 11/14* | (2006.01) | |
| *B60R 11/02* | (2006.01) | |
| *B60R 11/00* | (2006.01) | |
| *B64D 11/00* | (2006.01) | |

(52) U.S. Cl.
CPC ......... *B64D 11/0638* (2014.12); *B60R 11/02* (2013.01); *F16M 11/14* (2013.01); *F16M 13/022* (2013.01); *B60R 2011/0008* (2013.01); *B60R 2011/0059* (2013.01); *B60R 2011/0071* (2013.01); *B60R 2011/0089* (2013.01); *B64D 11/00152* (2014.12); *F16M 2200/022* (2013.01)

(58) Field of Classification Search
CPC .... F16M 13/02; F16M 13/022; F16M 11/041; F16M 11/10; F16M 13/00; F16M 2200/022; F16M 11/14; F16M 11/24; F16M 2200/027; F16M 11/2014; F16M 11/046; F16M 11/06; F16M 11/08; F16M 11/105
USPC .............. 248/288.31, 288.51, 229.1, 229.16, 248/229.14, 226.11, 228.1, 228.7, 230.1, 248/230.7, 231.81, 229.2; 403/122, 124, 403/127
See application file for complete search history.

(56) References Cited

U.S. PATENT DOCUMENTS

| | | | | |
|---|---|---|---|---|
| 5,645,254 A | * | 7/1997 | Ng | A47G 1/17 248/205.5 |
| 5,664,750 A | * | 9/1997 | Cohen | F16M 11/041 248/229.15 |
| 5,979,724 A | * | 11/1999 | Loewenthal, Jr. | B60R 11/0241 224/483 |
| 6,760,941 B2 | * | 7/2004 | Coleman, Jr. | A45D 42/16 294/65.5 |

(Continued)

*Primary Examiner* — Steven Marsh
(74) *Attorney, Agent, or Firm* — Michael A. Guth (57) ABSTRACT

A support system which allows for the mounting of a smart phone, or a video player, or similar electronic device, in a variety of ways at a distance from the user. The support system may be adapted to plug into the vents of an automobile, facilitating use of the electronic device while driving. The support system may include a kit of parts which allow for the mounting of a gripping clamp adapted to grip a smart phone. The kit may include a lever mount adapted to facilitate mounting of the support system, and the electronic device it supports, onto the stowed tray table of an airplane.

11 Claims, 11 Drawing Sheets

(56) References Cited

U.S. PATENT DOCUMENTS

| | | | |
|---|---|---|---|
| 6,929,229 B1* | 8/2005 | Palmby | A47G 23/0225 |
| | | | 248/311.2 |
| 8,967,395 B1* | 3/2015 | Lorenzana | A63B 55/10 |
| | | | 211/70.2 |
| 2010/0264281 A1* | 10/2010 | Bevirt | F16C 11/06 |
| | | | 248/121 |
| 2014/0246550 A1* | 9/2014 | Thier | F16M 13/022 |
| | | | 248/226.11 |

* cited by examiner

ADJUSTABLE VENT CLIP AND GRIPPING CLAMP SYSTEM

CROSS-REFERENCE TO RELATED APPLICATIONS

This application claims priority to U.S. Provisional Patent Application No. 62/153,491 to Balmer, filed Apr. 27, 2015, which is hereby incorporated by reference in its entirety.

BACKGROUND

Field of the Invention

This invention relates to mounting systems, and more specifically to a mounting system and a kit relating to same.

Description of Related Art

With the expansive use of the internet, more and more users are using their smartphones not only for telephone conversations but also as their primary portal to the internet. Further, the internet may be their source of entertainment content, such as movies. When the cell phone is the primary device for such a variety of uses, it may be desired to have a way to support, or mount, the cell phone in a variety of ways, to meet these myriad uses.

For a cell phone mount to be adapted for use in a large number of vehicles, one possible scenario is to mount onto, or into, a heater vent within the vehicle. These vents are seen widely across most vehicles. Further, the mount may be desired to be able to be positioned in a variety of angles, and to support a phone in either a landscape or portrait attitude.

When traveling by airplane, the user may desire that the cell phone mount system be adapted to be mounted onto an airplane seat feature, such as a tray table, to allow for further versatility.

What is called for is a system that allows for support of a cellular telephone in numerous mounting scenarios, and in a manner adapted to allow the phone to be positioned as desired by the user.

SUMMARY

A support system which allows for the mounting of a smart phone, or a video player, or similar electronic device, in a variety of ways at a distance from the user. The support system may be adapted to plug into the vents of an automobile, facilitating use of the electronic device while driving. The support system may include a kit of parts which allow for the mounting of a gripping clamp adapted to grip a smart phone. The kit may include a lever mount adapted to facilitate mounting of the support system, and the electronic device it supports, onto the stowed tray table of an airplane.

DETAILED DESCRIPTION

In some embodiments of the present invention, as seen in FIGS. 1A through 1E, a clip unit 40 is attached to a gripping clamp receptor 30. The clip unit includes a swivel ball 41 and a lock ring 42 which allow for movement of the gripping clamp receptor 30 relative to the clip unit 40.

The clip unit 40 may include a socket 51 adapted to receive a swivel ball 41. A lock ring 42 may tighten a ball flange 44 such that the ball is pulled tightly into a socket on the clip unit frame 43. With the loosening and tightening of this lock ring, the position of the unit can be adjusted to meet the needs of the user. The clip unit frame 43 has a deep, narrow, recess 52 adapted to receive a thin member, such as a vent blade seen in automobile heater vents, for example. The recess 52 may be lined with a resilient lining 47 which allows an item inserted into the recess 52 to be firmly gripped by clip unit.

Figure 1A:
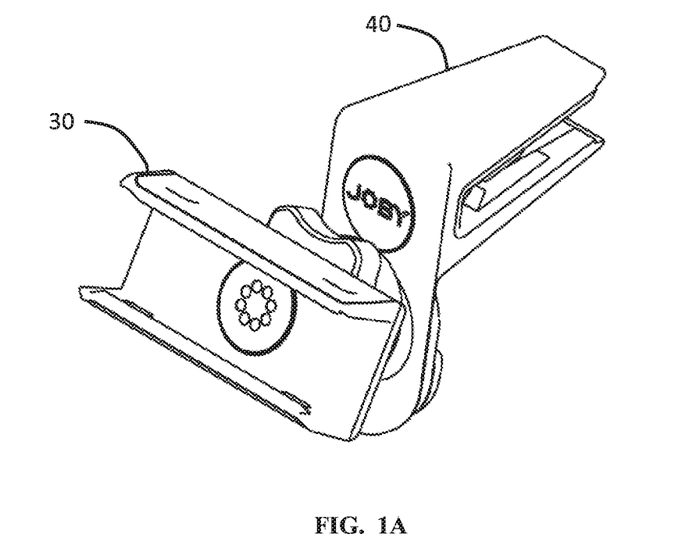
FIGS. 1A-E are views of a clip unit and gripping clamp receptor system according to some embodiments of the present invention.
Figure 1B:
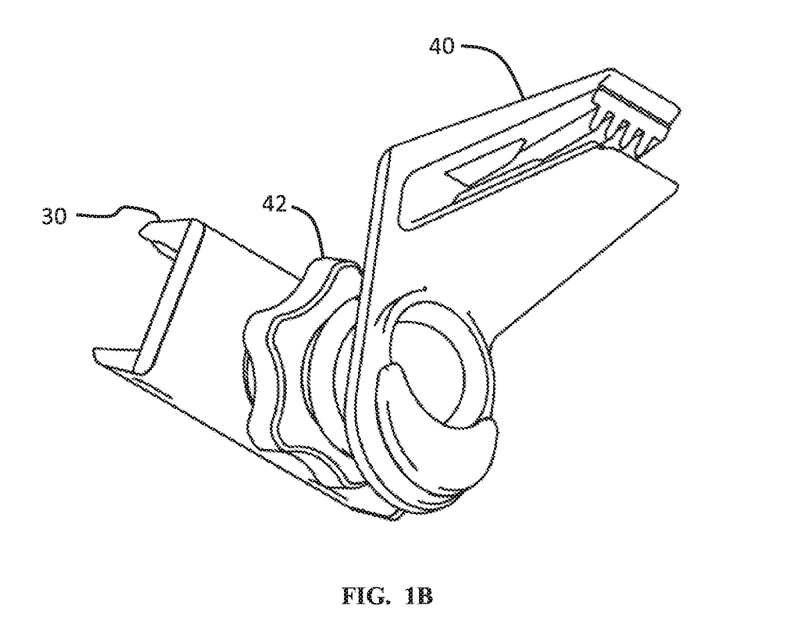
Figure 1C:
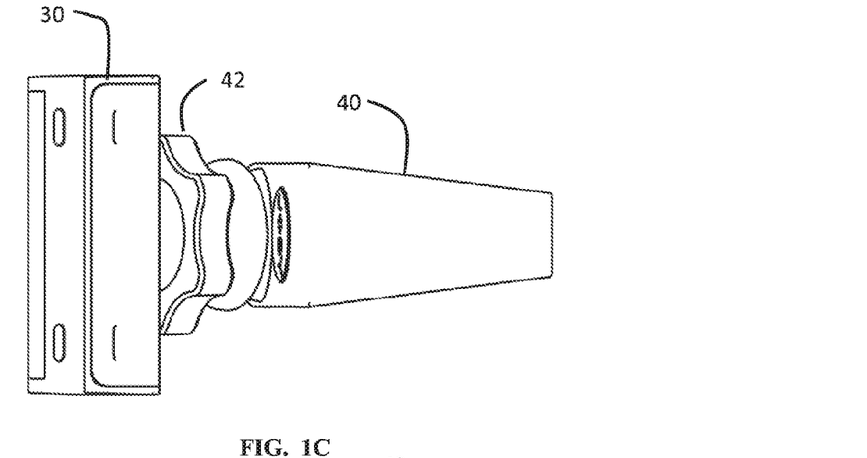
Figure 1D:
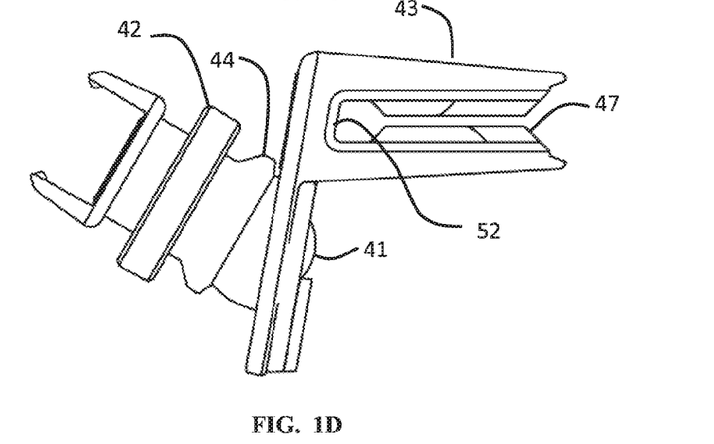
Figure 1E:
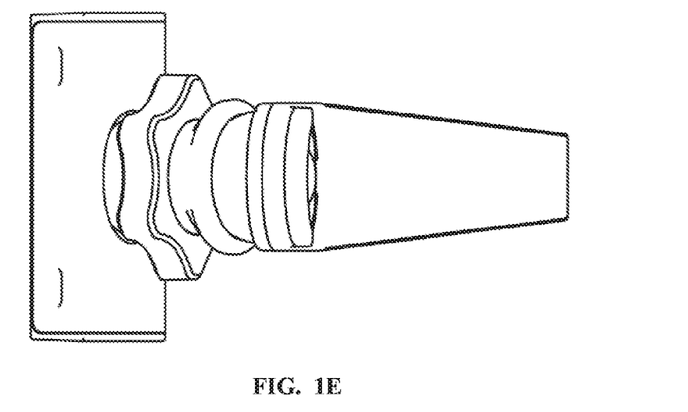
Figure 2:
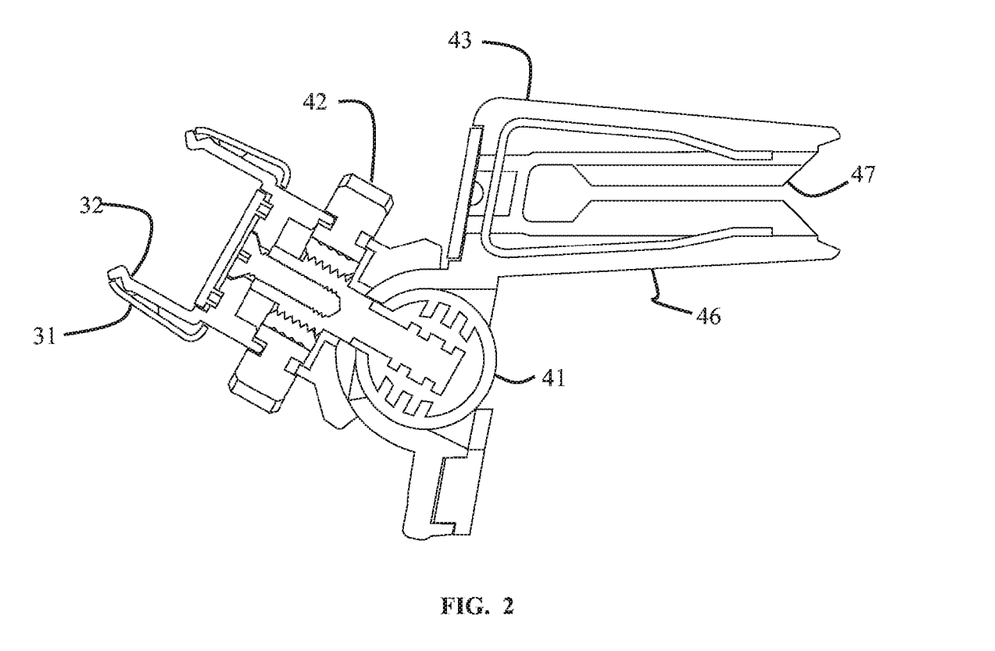
FIG. 2 is a cross sectional view of a clip unit and gripping clamp receptor system according to some embodiments of the present invention.
Figure 3:
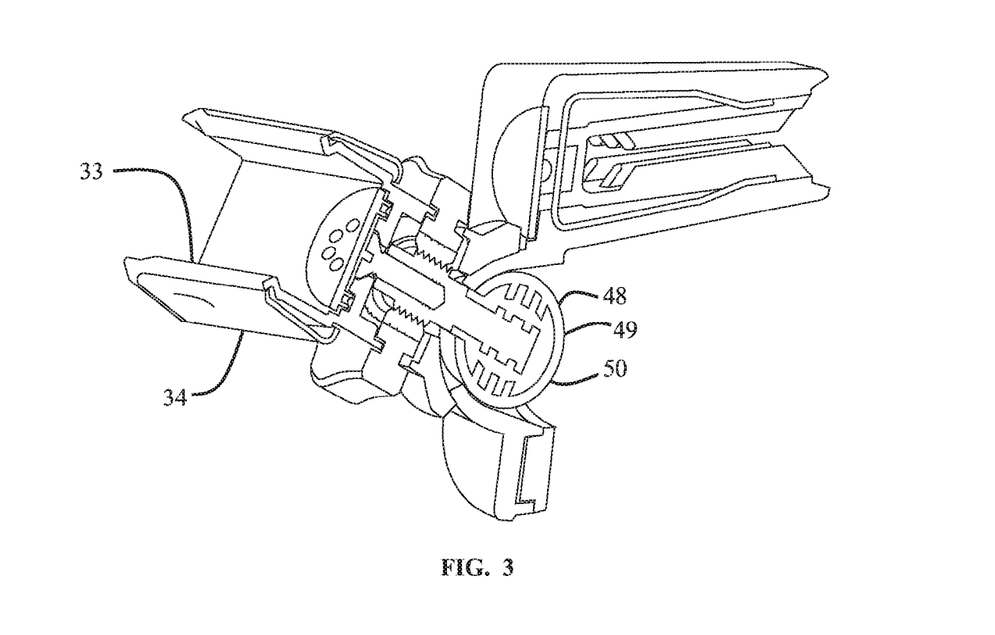
FIG. 3 is a cross sectional view of a clip unit and gripping clamp receptor system according to some embodiments of the present invention.

FIGS. 2 and 3 are illustrative cutaway views of a clip unit 40 attached to a gripping clamp receptor 30. Seen in the clip unit 40 is a metal insert 46 adapted to provide significant clamping force around an object inserted into the recess in the clip unit frame. The main frame material is molded over the metal insert 46, with the resilient lining 47 then molded into the recess 52 in a second, overmolding, process. The use of a metal, such as stainless steel, in the insert 46 allows for a strong grip which is not subject to creep, as would a clip that was fully plastic.

The swivel ball unit 41 includes a ball post 50 adapted to provide the physical interface to the lock nut 42. The ball post 50 has an outer thread 45 which receives the lock nut 42. The ball main portion 49 is molded over the ball post, and may be of a rigid plastic material. The ball cover 48 is then overmolded onto the ball main portion, and is of a resilient material adapted to provide a frictional fit in the inner surface of the socket 51. The ball post 50 is adapted to receive the gripping clamp receptor mounting screw 34, which is then covered with a screw cover 33.

The gripping clamp receptor 30 has a receptor frame 32, which is of a molded plastic in some aspects, with a receptor clamp 31 adapted to provide strong gripping force onto an item inserted into the receptor frame 32 of the gripping clamp receptor 30. The use of a metal, such as stainless steel, as the clamp 31 allows for a strong grip which is not subject to creep, as would a clamp that was fully plastic.

Figure 4A:
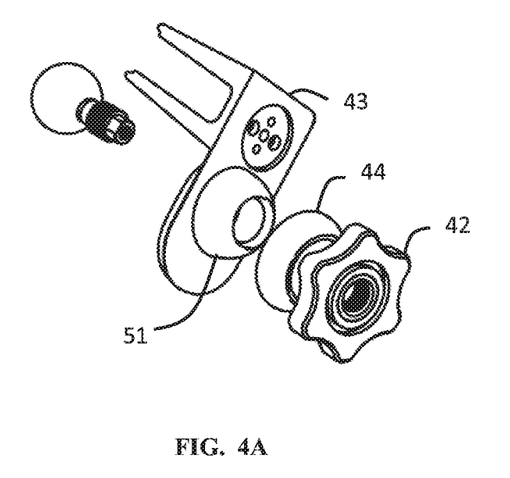
FIGS. 4A-B are views of a clip unit according to some embodiments of the present invention.
Figure 4B:
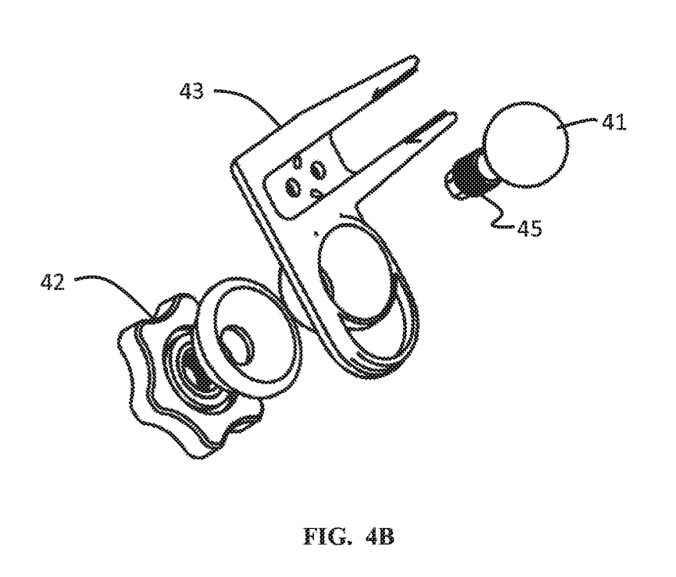
Figure 5:
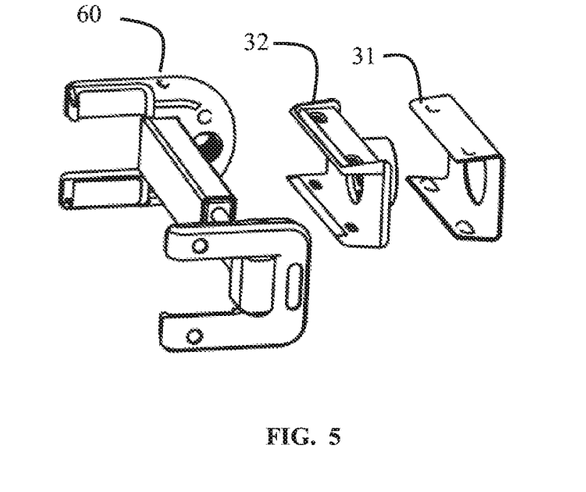
FIG. 5 is a view of a receptor gripping clamp and receptor according to some embodiments of the present invention.

FIGS. 4A and 4B illustrate exploded views of the clip unit 40 according to some embodiments of the present invention. The doubly molded ball 41 is inserted into the socket 51 of the clip unit frame 43. The resilient outer surface of the ball allows for a firm grip when the ball is pulled into the socket.

The ball is pulled into the socket as the lock ring 42 is threaded down the outer threads 45 of the ball unit assembly, using the ball flange 44 as the driver.

Figure 6A:
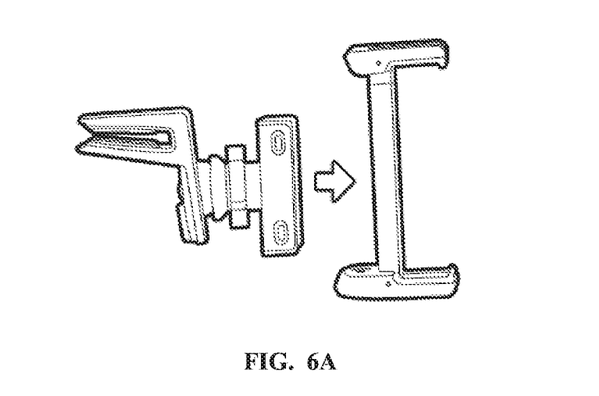
FIGS. 6A-E are illustrations of the use of an adjustable vent clip system according to some embodiments of the present invention.
Figure 6B:
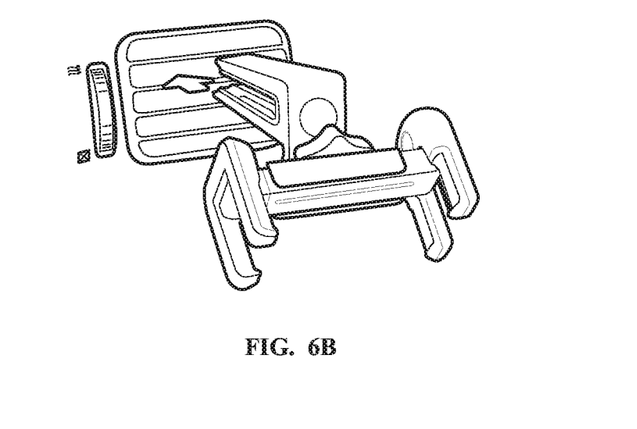
Figure 6C:
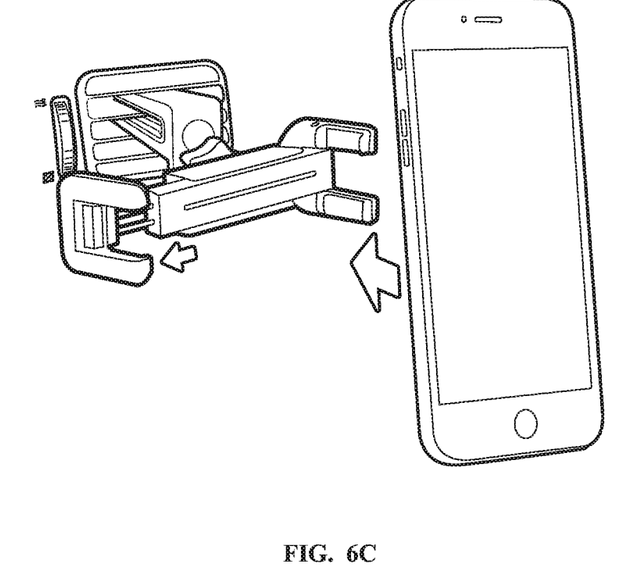
Figure 6D:
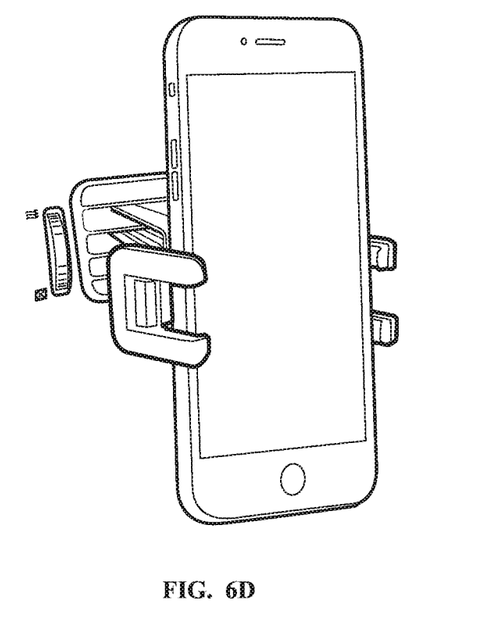
Figure 6E:
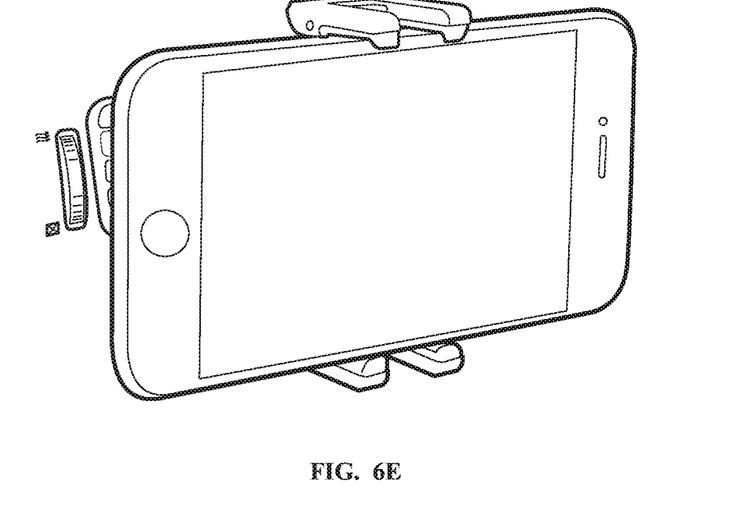

FIGS. 6A through 6E illustrate the use of an adjustable vent clip and gripping clamp system according to some embodiments of the present invention. FIG. 6A illustrates the gripping clamp ready to be inserted into the gripping clamp receptor. The gripping clamp has two arms, which are open. FIG. 6B illustrates a vent in an automobile with louvers which present a thin section for the vent clip. FIG. 6C illustrates the vent clip inserted into the vent, wherein a louver of the vent had been inserted into the recess in the clip frame. The gripping clamp arms may be spread open, against a spring which presents a closing force. A cellular telephone is readied for insertion between the grip arms of the gripping clamp. FIG. 6D illustrates a cell phone being held firmly using the adjustable vent clip and gripping clamp system. FIG. 6E illustrates another position which the phone may be held in. To move the phone from one position to the other, the lock ring may be loosened, allowing for the movement of the gripping clamp receiver.

Figure 7A:
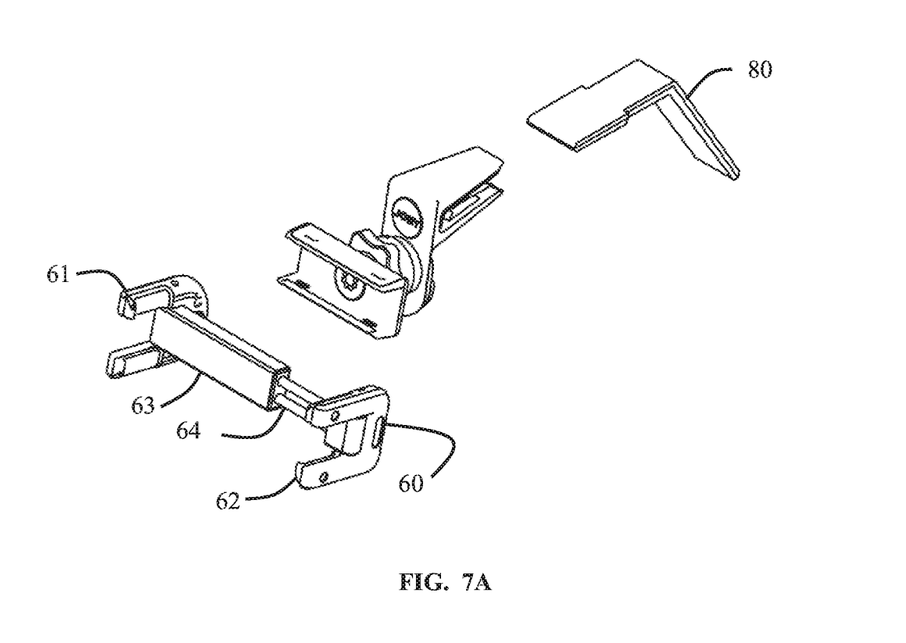
FIGS. 7A-C are illustrations of an adjustable vent clip system according to some embodiments of the present invention.
Figure 7B:
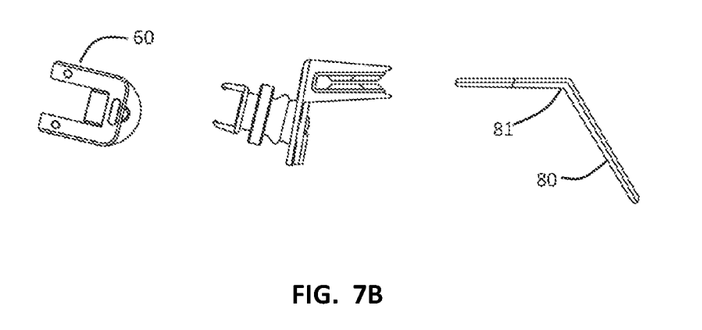
Figure 7C:
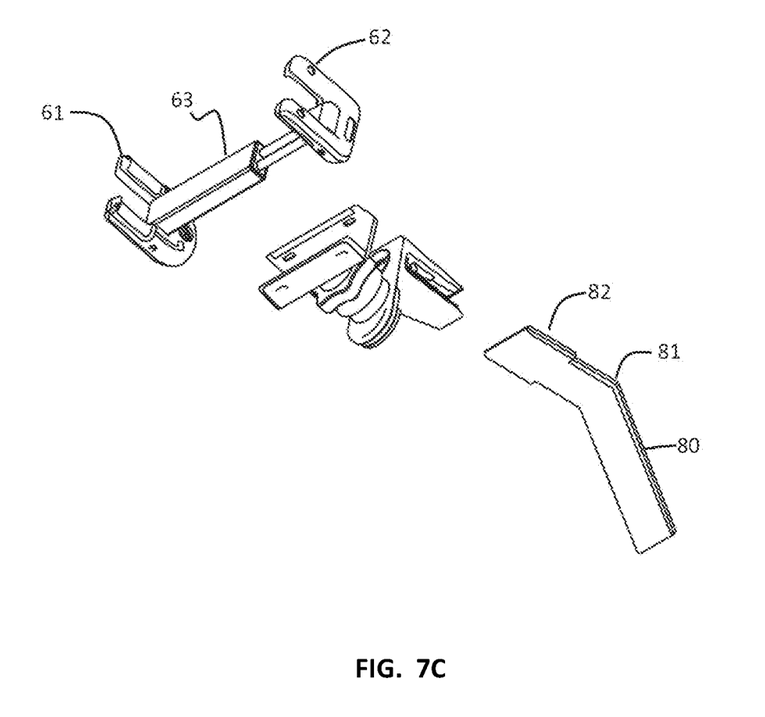

FIGS. 7A through 7C illustrate an exploded view of an adjustable vent clip and gripping clamp system according to some embodiments of the present invention. The gripping clamp 60 may be a clamp with gripping arms 61, 62 which may fold out to a deployed position from a stowed position in line with the central section 63. The gripping clamp 60 may have a central section 63 and an extension 64 which are able to be pulled from each other, thus increasing the distance between the gripping arms, while putting a tension force on the gripping arms. A mount lever 80 may be used to provide a way to mount the adjustable vent clip and gripping clamp system into other places which may be desired by the user. For example, the mount lever may be inserted behind a stowed and upright tray table in an airplane such that the cell phone may be held in front of the user. The mount lever 80 may have a bend 81 adapted to allow the mount lever to be placed behind a tray table. A mounting tab 82 is adapted to be placed into the recess of the clip unit, to present a virtual tab for the clip to mount onto.

Figure 8A:
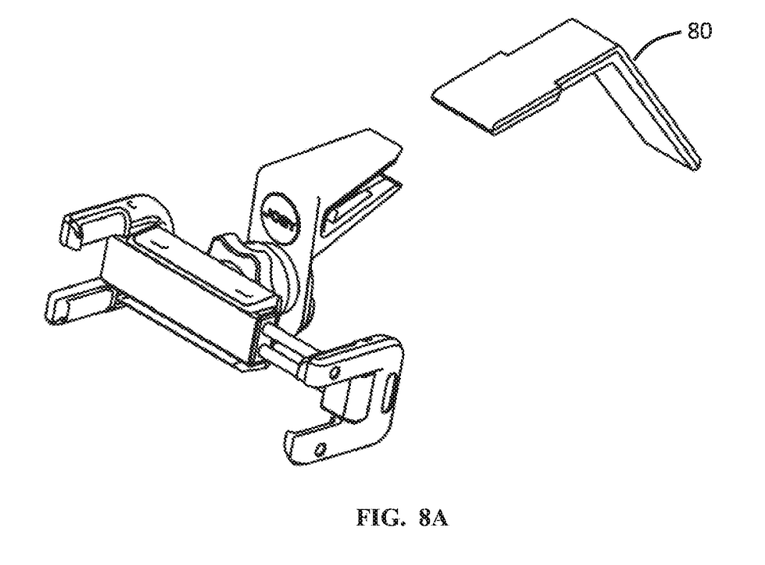
FIGS. 8A-C are illustrations of an adjustable vent clip system according to some embodiments of the present invention.
Figure 8B:
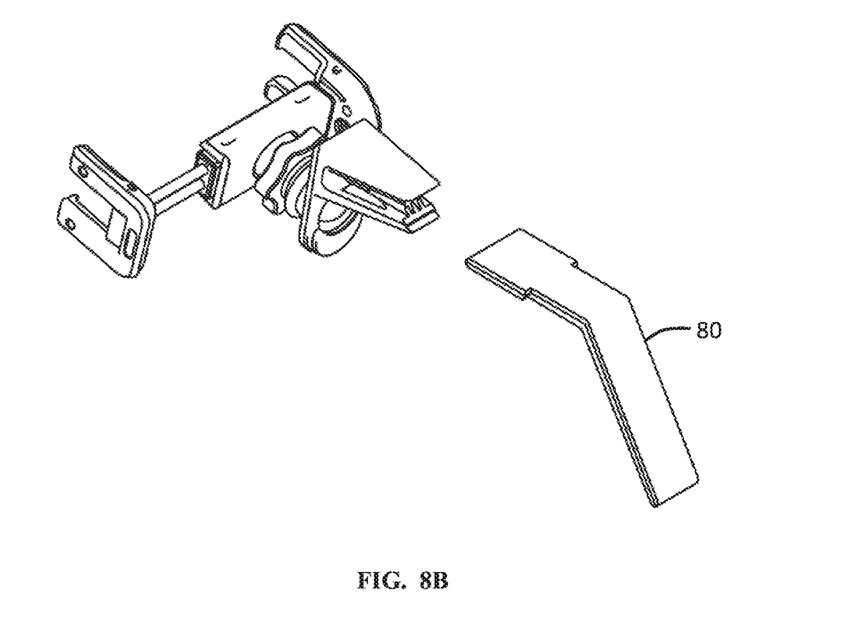
Figure 8C:
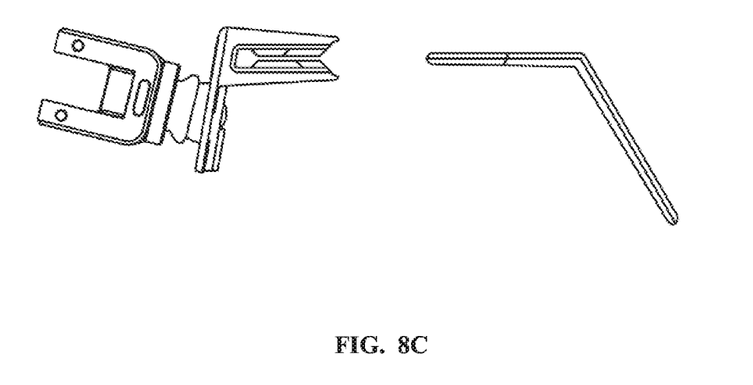
Figure 9A:
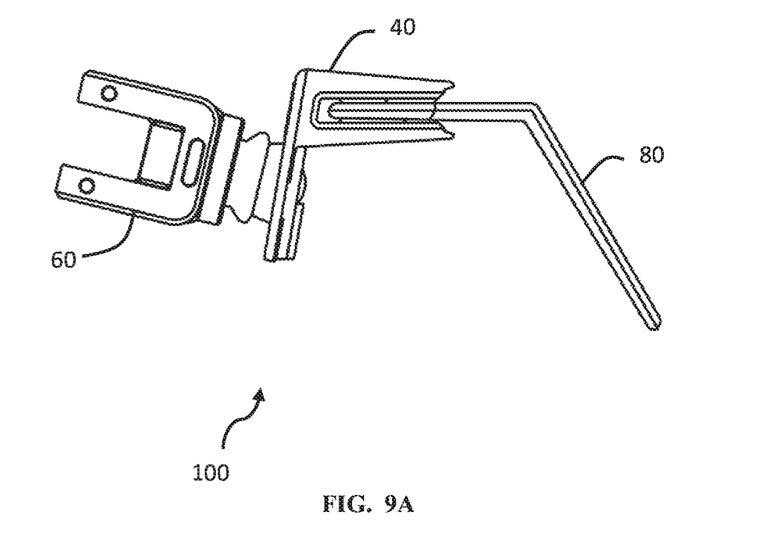
FIGS. 9A-C are illustrations of an adjustable vent clip system according to some embodiments of the present invention.
Figure 9B:
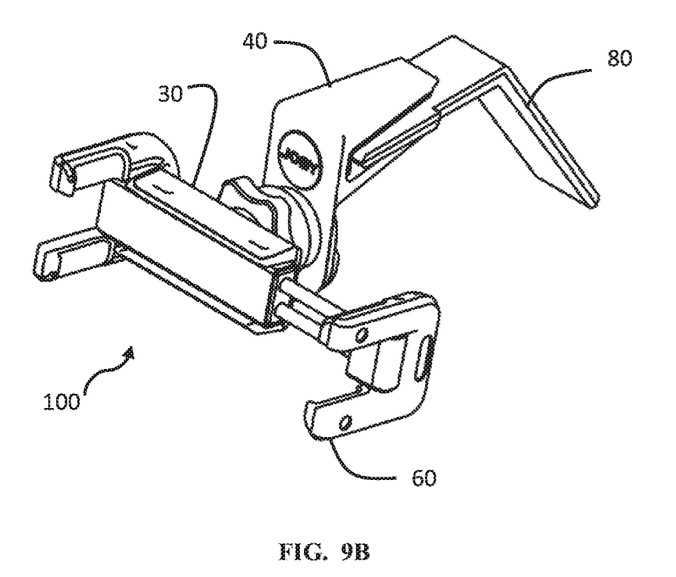
Figure 9C:
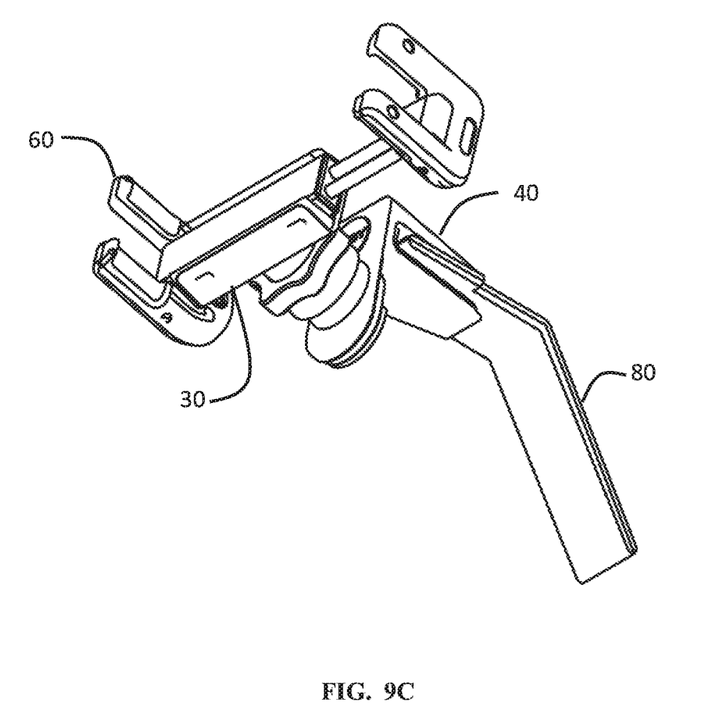

FIGS. 8A through 8C illustrate an exploded view of an adjustable vent clip and gripping clamp system according to some embodiments of the present invention. FIGS. 9A through 9C illustrate an exploded view of an adjustable vent clip and gripping clamp system 100 according to some embodiments of the present invention. The use of a stiff mount lever, and the use of steel clamps to provide significant stability to the clamped system, allow for a mount that minimizes jitter and vibration such that the user will have a better experience.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An adjustable vent clip system, said adjustable vent clip system comprising:
 a clip unit, said clip unit comprising:
  a clip unit frame, said clip unit frame comprising a socket;
  an adjustable ball attachment portion, said adjustable ball attachment portion coupled to said clip unit frame in a position relative to said clip unit frame, said adjustable ball attachment portion comprising;
  a ball, said ball residing in said socket; and
  a ball post, said ball post protruding through said clip unit frame; and
  a lock ring, said lock ring located around said ball post and adapted to lock the position of said ball post relative to said clip unit frame;
 a gripping clamp receptor, said gripping clamp receptor coupled to said ball post, said gripping clamp receptor comprising:
  a first grip arm; and
  a second grip arm.

2. The adjustable vent clip system of claim 1 further comprising a gripping clamp, said gripping clamp adapted to be received by said gripping clamp receptor between said first grip arm and said second grip arm.

3. The adjustable vent clip system of claim 1 wherein said clip unit frame comprises a narrow opening adapted to receive a thin member.

4. The adjustable vent clip system of claim 3 wherein said clip unit further comprises a resilient lining within said narrow opening.

5. The adjustable vent clip system of claim 4 further comprising a mount lever, said mount lever having a tab end adapted to fit into said narrow opening of said clip unit frame, said mount lever comprising a bend along the length of said mount lever.

6. The adjustable vent clip system of claim 1 wherein said gripping clamp receptor comprises receptor frame and a receptor clamp.

7. The adjustable vent clip system of claim 4 wherein said gripping clamp receptor comprises receptor frame and a receptor clamp.

8. The adjustable clamp system of claim 2 wherein said gripping clamp comprises a main body adapted to be received by the gripping clamp receiver.

9. The adjustable clamp system of claim 8 wherein said gripping clamp further comprises a first gripping arm on a first end and a second gripping arm on a second end.

10. The adjustable clamp system of claim 9 wherein said first gripping arm and said second gripping arm are separated at a distance when in a stowed position, and wherein the distance between said first gripping arm and said second gripping arm is extendable.

11. The adjustable clamp system of claim 9 wherein said first gripping arm and said second gripping arm are separated at a distance when in a stowed position, and wherein the distance between said first gripping arm and said second gripping arm is extendable, and wherein extension of said distance is resisted by a spring element.

* * * * *